July 7, 1953     A. STETTNER     2,644,265
FISH LURE
Filed Oct. 16, 1947
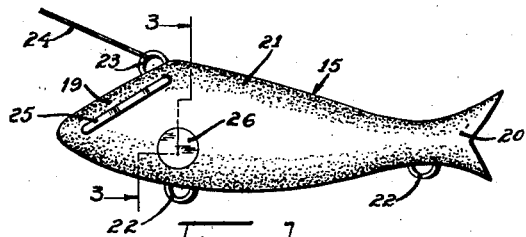
Fig. 1
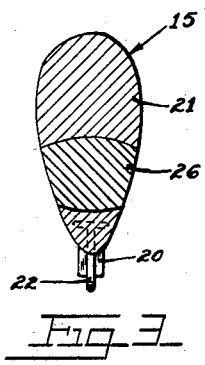
Fig. 3
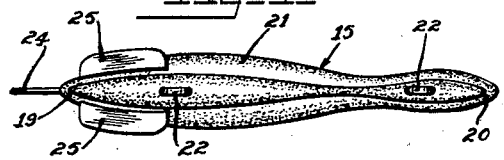
Fig. 2
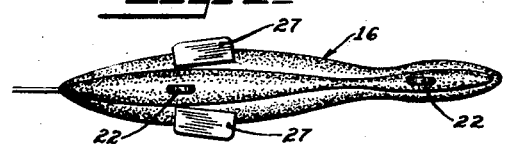
Fig. 4
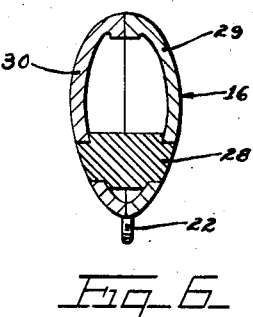
Fig. 6
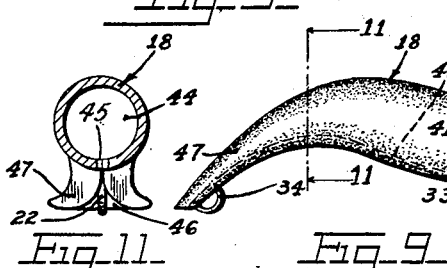
Fig. 5
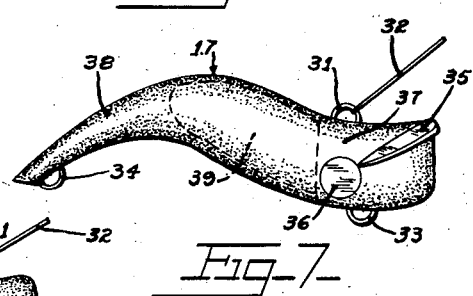
Fig. 7
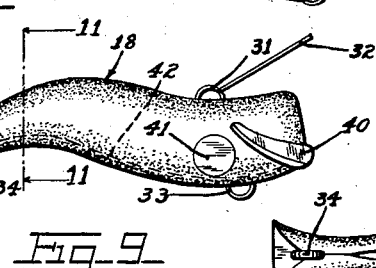
Fig. 11    Fig. 9
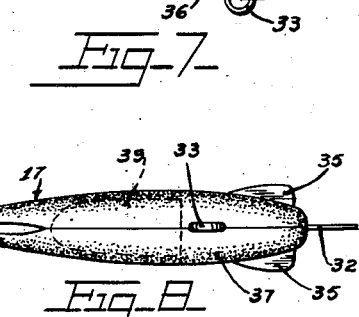
Fig. 8
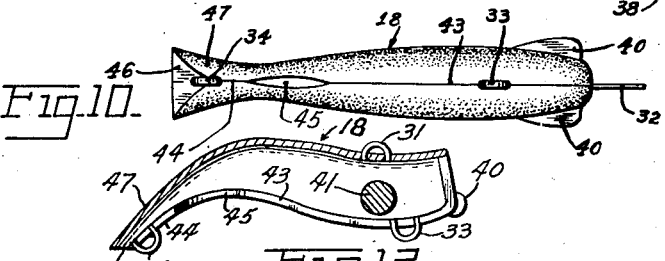
Fig. 10    Fig. 12
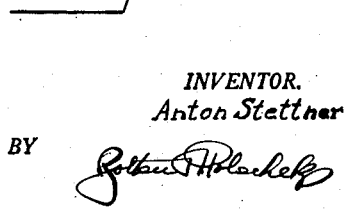
INVENTOR.
Anton Stettner
BY
ATTORNEY Patented July 7, 1953

2,644,265

UNITED STATES PATENT OFFICE 2,644,265

FISH LURE

Anton Stettner, Corpus Christi, Tex.

Application October 16, 1947, Serial No. 780,169

1 Claim. (Cl. 43—42.06)

This invention relates to new and useful improvements in fish lures, of the type simulating a live bait.

The invention provides an artificial bait which may be shaped and constructed to have the appearance, and the action when floating, or submerged, shallowly or deeply, of the swimming advance of a selected type of real fish or of another selected kind of water-living creature a simulation of which is desired for use at bait.

According to the invention, the bait, which may be wholly or partially of plastic, is characterized by the provision of fins on opposite sides of the bait, which react in response to the resistance of the water, when the bait is caused to move through the water, as in casting or during trolling or water-current-induced bait travel, in a way to hold the bait at a shallower or deeper submergence as decided on by the angler in accordance with the kind of fish being attempted to be caught.

The fins have what may be called a hydroplaning effect, and when travel of the bait is desired at a deeper level, the fins, balancingly placed on opposite sides of the head of the bait, are downwardly inclined toward their forward ends, while when travel of the bait is desired at a shallower level said fins are upwardly inclined toward their forward ends. In either case, the forward progress of the bait is suggestive of a swimming movement of a live bait.

With the fins made of plastic, and particularly when also the main portion of the bait is made of plastic, the bait can be made of such light weight itself, that excessive special weighting thereof at a particular point is avoided, and then, with the specially added light weight properly placed, travel of the bait through the water at the desired level is in such immediate and appropriate response to successive changes in the motion modifying action of the fins that the bait's forward movement suggests to a remarkable extent the actual swimming of a live bait.

A feature of the invention is the relatively light added weight, and its placement at a location relative to the fins such that the trailing main portion of the bait is freely floatingly extended away from the fins for increasing the liveliness of apparent activity of the tail of the bait.

The deceptive resemblance of the bait of the invention to a live bait may be increased by arranging the added weight so that parts or portions thereof will be exposed at the opposite sides of the head of the bait and so simulate the seeing eyes of a live bait.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 is a side elevation of one possible embodiment of the invention, this of the perch kind, and having its fins placed for travel of the bait at a deeper level in the water.

Fig. 2 is a bottom plan view thereof.

Fig. 3 is an enlarged sectional view, taken on the line 3—3 of Fig. 1.

Fig. 4 is a side elevation of another embodiment of the invention, this also of the perch kind, but having its fins placed for travel of the bait at a shallower level in the water.

Fig. 5 is a bottom plan view thereof.

Fig. 6 is an enlarged sectional view, taken on the line 6—6 of Fig. 4.

Fig. 7 is a side elevation of another possible embodiment, this of the shrimp kind, and having its fins placed for travel of the bait at a shallower level in the water.

Fig. 8 is a bottom plan view thereof.

Fig. 9 is a side elevation of another embodiment, this also of the shrimp kind, but having its fins placed for travel of the bait at a deeper level in the water.

Fig. 10 is a bottom plan view thereof.

Fig. 11 is a section taken on the line 11—11 of Fig. 9.

Fig. 12 is a longitudinal, sectional view of the lure shown in Fig. 9.

The bait of the present invention is herein shown, for example, as substantially wholly made of a suitable plastic; and, to indicate in some small measure the various possible ways of so fabricating the bait, the bait 15 of Figs. 1–3 is illustrated as mainly incorporating a single solid plastic molding, the main body of the bait 16 of Figs. 4–6 is illustrated as being made of two hollow matching longitudinal sections, the main body of the bait 17 of Figs. 7 and 8 is illustrated as partially hollow and partially solid in different subdivisions thereof, and the main body of the bait 18 of Figs. 9 to 12 is illustrated as of hollow one-piece construction.

Referring particularly to Figs. 1–3, the bait 15 has a head 19, a tail 20, and an intermediate body portion 21 provided with any desired number of suitably anchored eyes 22 two being shown for attachment thereto of a fishing hook. A third suitably anchored eye 23 is shown for attachment of the fish-line 24. One possible way of anchoring said eyes 22 and 23 is indicated in Fig. 3, wherein the eye 22 is shown having a pair of shank lengths oppositely bent at their free ends and there embedded in the plastic material of which the bait is made.

The fins 25 carried by the head 19 are, it will be noted, forwardly and downwardly inclined.

The weight 26, with portions thereof exposed at opposite sides of the head 19 to simulate actual seeing eyes, is shown as a single mass of lead extending across the head 19 perpendicular to the length of the bait and having a central somewhat enlarged portion so that when the plastic part of the bait is moulded around said weight the latter is locked in place against accidental loss.

Referring to Figs. 4-6, the bait 16 is shown as in appearance exactly like the bait 15, except that the fins, marked 27, are forwardly and upwardly inclined. The weight, marked 28, has a central cylindrical portion of larger diameter, so as to provide shoulders as shown in Fig. 6; and, also as there shown, the bait is hollow throughout almost its entire length, as the result of being made by assembling against said shoulders of the weight 28, two shell-like bait halves 29 and 30. With such halves arranged relative to the weight 28 as shown in Fig. 6, their meeting edges are adhesively connected.

Referring to Figs. 7 and 8, the bait 17, provided with an eye 31 for having attached thereto the fish-line 32, and with eyes 33 and 34 for the attachment of fishing hooks, has its fins 35 forwardly and upwardly inclined, as in Fig. 4.

At 36 is indicated the weight, near the fins as in the forms of the invention above described in detail.

The bait 17 is illustrated as composed of two sections, both desirably of plastic; a forward section 37, with the weight 36 embedded therein, and a rear section 38, hollow as indicated at 39 over a major forward portion thereof and solid at the tail portion thereof. These sections may be secured together in any desired manner. For example, a forward rim on the rear section could be matched with the rear end of the forward section and adhesively connected thereto.

Referring to Figs. 9 to 12, the bait 18 is in all respects exactly like the bait 17 in top and side appearance, except that the fins, marked 40, are forwardly and downwardly inclined, like the fins 25. The weight, suitably embedded in the head of the bait, is indicated at 41.

Structurally, the bait 18 is hollow and at the same time a one-piece structure as to all parts thereof except the weight 41 and the eyes corresponding to the eyes 31, 33 and 34; in which latter connection it may be pointed out that such eyes, and the corresponding eyes of all the other forms of the invention, may be of plastic, molded integral with the main structure of the bait.

With the main structure of the bait 18 molded of plastic, it may thus be made to provide a structure such as illustrated. A shell would first be molded having the lateral and longitudinal contour of the top half of the illustrated structure and otherwise in accordance with the shape of the latter but split and rather widely separated along the line 42 of Fig. 9, that is, along the bottom length of the bait and up along the height of the head of the bait; and later, following the addition of a suitable temporary plasticiser, said shell would be folded in along such split and pressed to final shape at the bottom of the bait and there to close in the latter, as for instance indicated at 43 and 44. The openings 45 and 46 may advisedly be present, so that water entering the opening 45 will spill through the opening 46, and thus give the illusion of a swimming snap on the tail 47. Thus, in this form of the invention, the bait is formed of a single plastic blank in the contour illustrated and with the blank folded over until the ends meet to provide the hollow interior seen in Fig. 11. The two openings 45 and 46 have been previously provided for, when the plastic blank was initially molded.

With the fins attached in the manner shown in Figs. 1 and 9, they cause the bait to dive downward for fishing in deep waters and eliminate the use of an excessively heavy lead or weight in the fore part of the bait. With the fins attached in the manner shown in Figs. 4 and 7, not only do they cause the bait to travel at or near the surface of the water depending on how fast the bait is being pulled, thus allowing shallow and semi-shallow fishing, but the bait is heavy enough to cast easily, especially so when the bait is small.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

In a fishing lure having a one-piece body including a head portion and a rearwardly and downwardly inclined tail portion having hollow interior, the forwardly facing wall of the downwardly and rearwardly inclined tail portion having an inlet opening communicating with the front end of the hollow tail portion, the bottom end of the inclined tail portion having a discharge opening, a weight mounted laterally through the body forward of the hollow tail portion, and means for securing the end of a line to the body substantially directly over said weight, so constructed and arranged that as the body is drawn through water said weight will hold the front end of the body down and water will enter said inlet opening and flow through the hollow and discharge from said discharge opening producing a swimming snap in the tail portion with the body pivoting horizontally about its point of attachment to the line, said weight being metallic and having its ends exposed on opposite sides of the body simulating eyes.

ANTON STETTNER.

References Cited in the file of this patent

UNITED STATES PATENTS

| Number | Name | Date |
|---|---|---|
| 744,942 | Stewart | Nov. 24, 1903 |
| 843,256 | Bowersox | Feb. 5, 1907 |
| 1,110,956 | McBride | Sept. 15, 1914 |
| 1,188,583 | Townsend | June 27, 1916 |
| 1,892,892 | Jamar | Jan. 3, 1933 |
| 2,007,045 | Francis | July 2, 1935 |
| 2,261,549 | Hayes | Nov. 4, 1941 |
| 2,307,200 | Cullerton | Jan. 5, 1943 |
| 2,445,523 | Goldbach | July 20, 1948 |
| 2,483,245 | Steinhart | Sept. 27, 1949 |

FOREIGN PATENTS

| Number | Country | Date |
|---|---|---|
| 128,073 | Great Britain | June 19, 1919 |
| 64,856 | Norway | May 12, 1947 |